US007780382B2

(12) United States Patent
Kitaura et al.

(10) Patent No.: US 7,780,382 B2
(45) Date of Patent: Aug. 24, 2010

(54) TOOL UNCLAMPING DEVICE (75) Inventors: Ichiro Kitaura, Itami (JP); Takayuki Munechika, Itami (JP)

(73) Assignee: Pascal Engineering Corporation, Itami-shi (JP)

( * ) Notice: Subject to any disclaimer, the term of this patent is extended or adjusted under 35 U.S.C. 154(b) by 0 days.

(21) Appl. No.: 11/885,155

(22) PCT Filed: Oct. 11, 2006

(86) PCT No.: PCT/JP2006/320276

§ 371 (c)(1),
(2), (4) Date: Aug. 27, 2007

(87) PCT Pub. No.: WO2007/046278

PCT Pub. Date: Apr. 26, 2007

(65) Prior Publication Data

US 2008/0161176 A1    Jul. 3, 2008

(30) Foreign Application Priority Data

Oct. 18, 2005    (JP)    ............................. 2005-303299

(51) Int. Cl.
*B23C 5/26*    (2006.01)
(52) U.S. Cl. ....................... 409/233; 409/136
(58) Field of Classification Search ................ 409/233, 409/232, 231, 135–136; 408/239 A, 239 R
See application file for complete search history.

(56) References Cited

U.S. PATENT DOCUMENTS 3,898,911 A * 8/1975 DeCaussin .................. 409/233
6,431,803 B1 * 8/2002 Chu ........................... 409/233
2007/0290459 A1    12/2007 Kitaura et al.

FOREIGN PATENT DOCUMENTS

| DE | 102 42 449 A1 | 3/2004 |
| JP | 1-114205 U | 8/1989 |
| JP | 6-63806 A | 3/1994 |
| JP | 3083921 B2 | 6/2000 |
| WO | WO-2007/034746 A1 | 3/2007 |

OTHER PUBLICATIONS

Machine Translation of DE 10242449.*
Machine Translation of JP-06-63806.*

* cited by examiner

*Primary Examiner*—Erica E Cadugan
(74) *Attorney, Agent, or Firm*—Birch, Stewart, Kolasch & Birch, LLP

(57) ABSTRACT

A tool unclamping device according to the present invention comprises a motor, a rotary shaft connected to the motor, a cam provided on the rotary shaft, a power transmission member, pressed by the cam to be axially movable, having a recess at the center in the radial direction thereof, a frame so provided as to enclose the power transmission mechanism, a support member inserted into the power transmission mechanism in the radial direction thereof and fixed to the frame, an elastic member set in the recess located between the power transmission member and the support member for urging the power transmission member toward the motor and an output shaft driven by power from the power transmission mechanism for unclamping a tool.

12 Claims, 11 Drawing Sheets

TOOL UNCLAMPING DEVICE

TECHNICAL FIELD

The present invention relates to a tool unclamping device, and more specifically, it relates to a tool unclamping device capable of releasing and unclamping a tool clamped to a spindle when exchanging a tool mounted on the spindle of a machine tool.

BACKGROUND ART

A machine tool comprising a tool magazine storing tools and a tool changer capable of automatically exchanging a tool is known in general. The spindle of such a machine tool has a structure capable of automatically attaching/detaching a tool so that the tool changer can automatically exchange the tool mounted on the spindle. In order to exchange the tool mounted on the spindle of the machine tool, it is necessary to release the tool from the spindle of the machine tool through the tool changer. Japanese Patent No. 3083921 describes an exemplary tool changer.

This tool changer comprises a support frame, a rotary shaft connected to a motor, a cam formed on this rotary shaft, an upper shaft portion supported by the support frame and pressed by the cam, a drawbar pressed by the upper shaft portion, disc springs upwardly urging the drawbar, support springs pressing the upper shaft portion in a direction for separating from the drawbar and an oil supply mechanism supplying cutting oil.

In the tool changer having this structure, the contact position between the outer peripheral surface of the cam and the upper shaft portion is upwardly displaced upon completion of a tool unclamping operation. The upper shaft portion is displaced in the direction for separating from the drawbar due to pressing force from the support springs. Further, the drawbar is upwardly displaced due to pressing force from the disc springs. A spindle grasps an exchanged tool.

Patent Document 1: Japanese Patent No. 3083921

DISCLOSURE OF THE INVENTION

Problems to be Solved by the Invention

In the tool attaching/detaching device described in the aforementioned Japanese Patent No. 3083921, the support springs are so arranged as to upwardly press parts of the upper shaft portion separating from the centerline. When the upper shaft portion slides to approach to or separate from the drawbar, therefore, the upper shaft portion is easily inclined, easily causes backlash between the same and the support frame, and is not excellently slidable.

The aforementioned support springs may be annularly arranged about the centerline of the upper shaft portion, thereby inhibiting the upper shaft portion and the support frame from causing backlash therebetween.

However, the characteristics of the support springs are not necessarily completely identical to each other, and hence stress applied from the support springs to the upper shaft portion is easily uneven. Therefore, it is difficult to excellently suppress backlash caused between the upper shaft portion and the support frame by the aforementioned method.

When the upper shaft portion is not excellently slidable, the upper shaft portion cannot excellently press the drawbar, and the power necessary for unclamping the tool is hardly transmittable to the drawbar. Thus, the tool grasped by the spindle cannot be excellently unclamped.

While the upper shaft portion must be retreated to a position separating from the drawbar in working in the aforementioned tool changer, a margin must be previously added to the quantity of retreat of the upper shaft portion in consideration of the aforementioned difficulty in sliding of the upper shaft portion. Therefore, the upper shaft portion requires a long time for reaching the drawbar when unclamping the tool, to disadvantageously require a long time for unclamping the tool.

The present invention has been proposed in consideration of the aforementioned problems, and an object thereof is to provide a tool unclamping device capable of excellently sliding a power transmission member transmitting power from a motor to a drawbar and capable of unclamping a tool in a short time.

Means for Solving the Problems

The tool unclamping device according to the present invention is a tool unclamping device capable of unclamping a tool clamped to a spindle of a machine tool, comprising a motor, a rotary shaft connected to the motor, a cam provided on the rotary shaft, a power transmission member pressed by the cam to be axially movable, a frame so arranged as to enclose the power transmission member, an elastic member, having a central axis coinciding with the centerline of the power transmission member, arranged against pressing force of the cam, a pressing member, provided on the power transmission member, capable of controlling the position of the power transmission member along the direction of the centerline and an output shaft pressed by the pressing member for unclamping the tool. Preferably, the aforementioned power transmission member has a recess at the center in the radial direction thereof, the frame has a support portion located in the recess, and the elastic member is arranged in the recess located between the support portion and the power transmission member. Preferably, the aforementioned power transmission member has a leg protruding toward the output shaft beyond the frame and a protrusion formed on the outer surface of the leg for protruding from the leg in a radially expanding direction, the frame has a support portion arranged on the outer peripheral surface side of the power transmission member and located closer to the output shaft than the protrusion, and the elastic member is arranged between the support portion and the protrusion. Preferably, the tool unclamping device further comprises an oil supply mechanism capable of supplying oil to the aforementioned tool, and a supply passage supplying the oil to the oil supply mechanism is formed on the frame. Preferably, the tool unclamping device further comprises a storage chamber defined by the frame and another hollow frame provided on the frame, the rotary shaft is rotatably supported through a bearing provided in the storage chamber, and the storage chamber is filled with lubricating oil up to a portion located above the bearing. Preferably, the aforementioned storage chamber is provided with a first through-hole receiving the rotary shaft and a second through-hole receiving the power transmission member, and the tool unclamping device further comprises a first sealing member capable of blocking a space between the outer surface of the rotary shaft and an opening edge of the first through-hole and a second sealing member capable of blocking a space between the outer surface of the power transmission member and an opening edge of the second through-hole. Preferably, the tool unclamping device further comprises a gas supply mechanism capable of supplying gas to the tool, and a supply passage supplying the gas to the gas supply mechanism is formed on the frame. Preferably, the tool unclamping device further comprises a recess formed on the surface of any of a member mounted on the aforementioned rotary shaft, the said rotary shaft and the said cam and a pressing member urged toward the recess and partially received in the recess. Preferably, the tool unclamping device further comprises a holding mechanism capable of holding the pressing member in the recess. Preferably, the aforementioned holding mechanism includes a resistance area provided on a position of the surface frontwardly adjacent to the recess in the rotational direction of the rotary shaft for receiving pressing force larger than that applied to the remaining portion from the pressing member oppositely to the rotational direction. Preferably, the aforementioned holding mechanism includes a load mechanism, capable of actuating the motor in a loaded state, applying a prescribed load to the rotary shaft.

Effects of the Invention

According to the inventive tool unclamping device, power from the motor can be excellently transmitted to a drawbar so that the tool grasped by the spindle can be unclamped in a short time by excellently sliding the power transmission member transmitting the power from the motor to the drawbar.

DESCRIPTION OF REFERENCE NUMERALS

1 motor, 2 speed change gear, 3 rotary shaft, 4 cam, 5 piston, 5a recess, 5b1 pressing member, 5b leg, 5c through-hole, 6 cam follower, 7 elastic member, 10 frame, 12b joint support member, 12a plate, 12 support member, 15 drawbar, 16 disc spring, 17 collet, 22 spindle, 26a1, 26a2 joint, 26 oil supply mechanism, 30 elastic member, 100 tool unclamping device.

BEST MODES FOR CARRYING OUT THE INVENTION

First Embodiment

Figure 1:
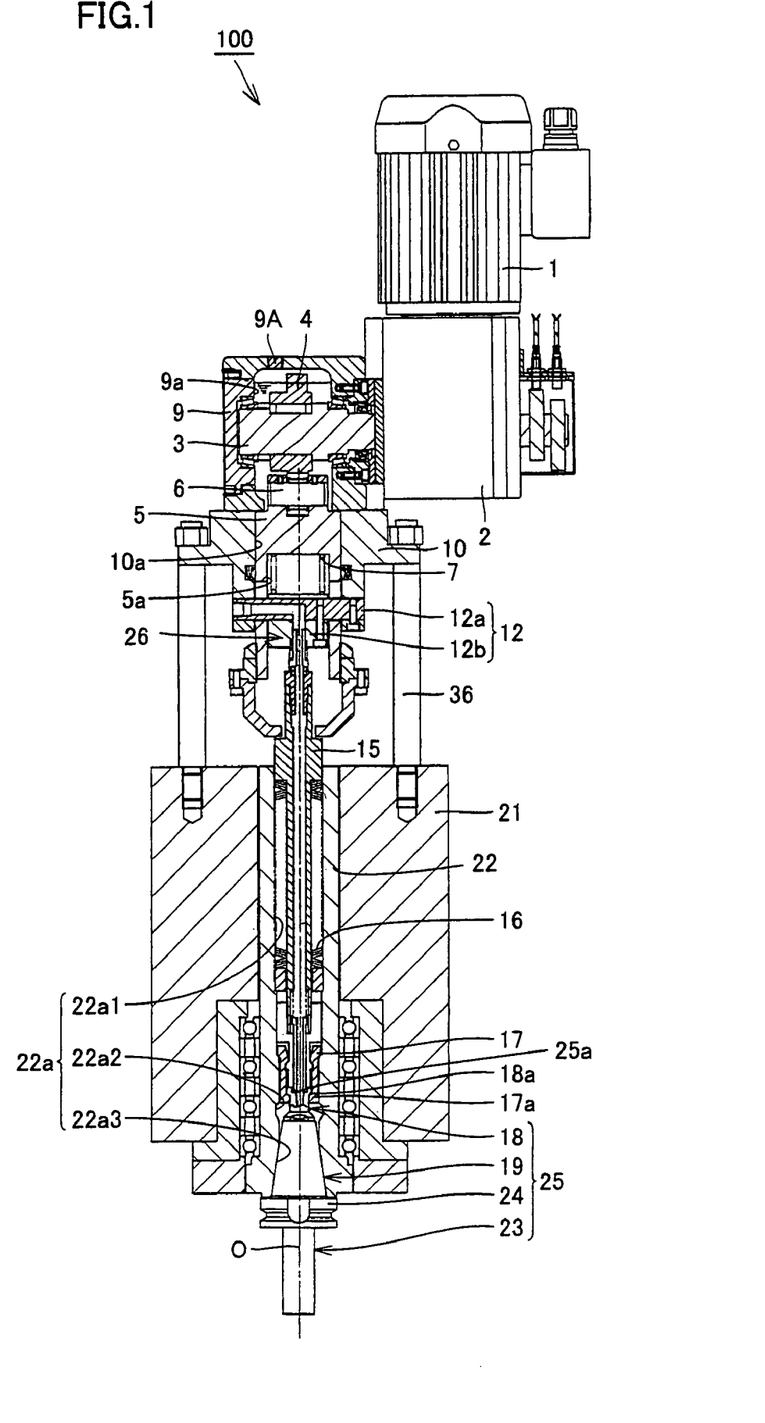
FIG. 1 is a sectional view of a tool unclamping device according to a first embodiment.

A tool unclamping device 100 according to a first embodiment is described with reference to FIGS. 1 to 4. FIG. 1 is a sectional view of tool unclamping device 100 according to this embodiment. As shown in FIG. 1, tool unclamping device 100 is a device unclamping a tool clamped to a spindle of a machine tool, and comprises a motor 1, a rotary shaft 3 connected to this motor 1 through a speed change gear 2, a cam 4 provided on this rotary shaft 3, a piston (power transmission member) 5, pressed by this cam 4 to be movable, having a recess 5a at the radial center, a frame 10 so provided as to enclose this piston 5, a support member (support portion) 12 inserted into piston 5 in the radial direction thereof and fixed to frame 10, an elastic member 7 arranged in recess 5a located between piston 5 and support member 12 for urging piston 5 toward motor 1, a drawbar (output shaft) 15 driven by power from piston 5 for unclamping the tool and an oil supply mechanism 26 supplying oil to a tool 25 grasped by a spindle 22. Spindle 22 is inserted into a spindle head 21, and tool 25 is grasped on the lower end of this spindle 22.

A hollow frame (another frame) 9 is fixed to the upper surface of frame 10. This frame 9, frame 10 and the upper surface of piston 5 form a storage chamber 9a, so that rotary shaft 3 and a cam follower 6 are arranged in this storage chamber 9a.

Figure 2:
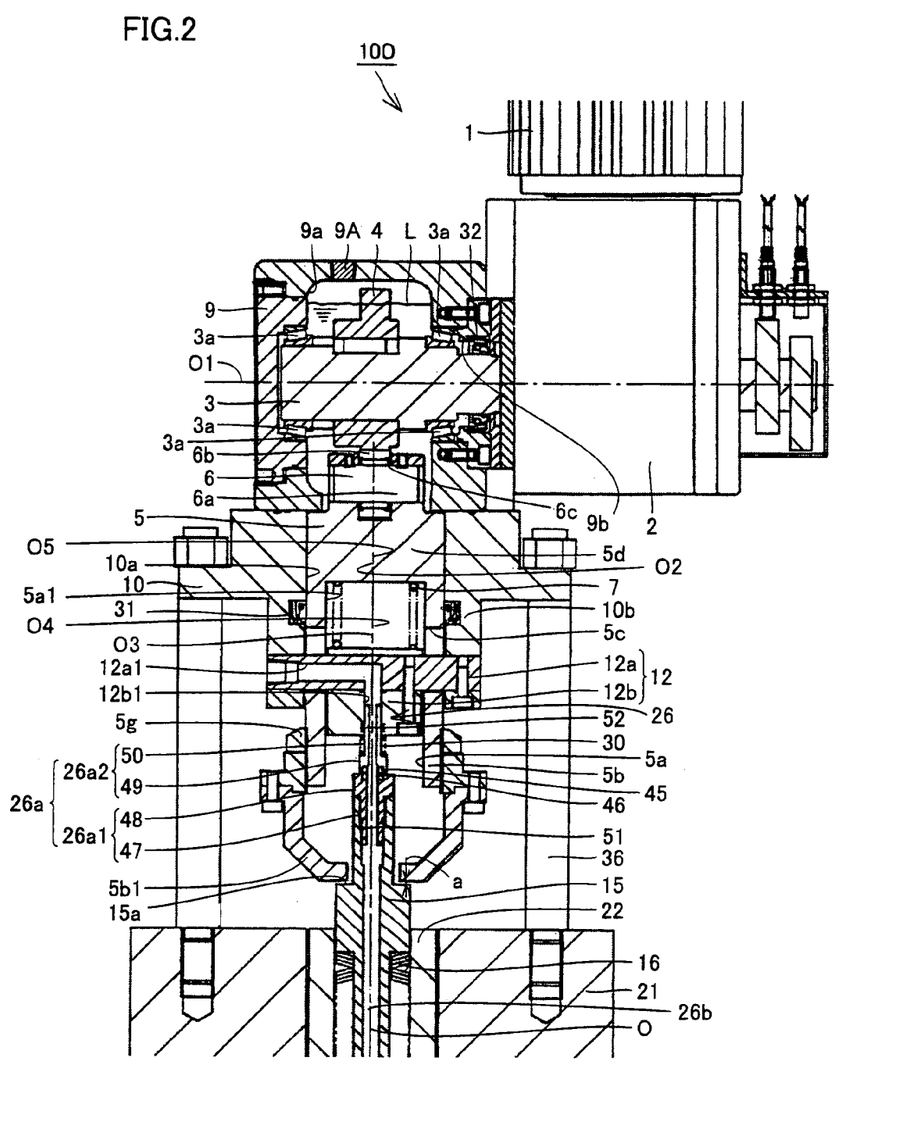
FIG. 2 is a sectional view of the tool unclamping device showing a portion around a piston in FIG. 1 in an enlarged manner.

FIG. 2 is a sectional view of tool unclamping device 100 showing a portion around piston 5 in FIG. 1 in an enlarged manner. As shown in FIG. 2, a through-hole 9b receiving rotary shaft 3 is formed in frame 9, and an oil seal (first sealing member) 32 is arranged on the inner peripheral edge of this through-hole 9b. This oil seal 32 blocks a clearance between the inner peripheral edge of a through-hole 9b and the outer peripheral surface of rotary shaft 3, thereby inhibiting lubricating oil filling up storage chamber 9a from leaking toward speed change gear 2 or outward.

Frame 10 is provided with through-hole 10a receiving piston 5 and passing therethrough from rotary shaft 3 toward drawbar 15, and frame 9 is so arranged as to cover an opening of this through-hole 10a closer to rotary shaft 3. Another oil seal (second sealing member) 31 is formed on the inner peripheral surface of this through-hole 10a. This oil seal 31 blocks a clearance between the inner peripheral surface of through-hole 10a and the outer peripheral surface of piston 5, thereby inhibiting the lubricating oil filling up storage chamber 9a from leaking outward. An oil supply port 9A supplying the lubricating oil into storage chamber 9a is formed on the upper surface of frame 9.

Motor 1 is arranged on the upper end side of drawbar 15, while speed change gear 2 is arranged on the lower surface side of motor 1. Thus, motor 1 serving as a power source and speed change gear 2 are so arranged on the upper end side of drawbar 15 that the area for setting tool unclamping device 100 can be reduced. Further, speed change gear 2 is so arranged on the lower surface side of motor 1 that reduction of the area for setting tool unclamping device 100 can be further prompted.

Rotary shaft 3 connected to speed change gear 2 is inserted into through-hole 9b formed on the side surface of frame 9 and arranged in storage chamber 9a. This rotary shaft 3 is rotatably supported in storage chamber 9a through a bearing 3a provided on the inner wall surface of frame 9. Storage chamber 9a is filled with the lubricating oil up to a position L located above bearing 3a, so that bearing 3a is dipped in the lubricating oil. Therefore, friction caused between bearing 3a and rotary shaft 3 can be reduced, the power from motor 1 can be converted to rotational power for rotary shaft 3, and rotary shaft 3 can be inhibited from vibration upon rotation. Further, bearing 3a is so dipped in the lubricating oil that the friction between bearing 3a and rotary shaft 3 can be reduced without maintenance over a long period.

Cam 4 is fixed onto the outer peripheral surface of rotary shaft 3, and piston 5 is arranged on the lower surface side of this cam 4. Cam follower 6 coming into sliding contact with the outer peripheral surface of cam 4 for transmitting the power from motor 1 to piston 5 is provided on an end of piston 5 closer to cam 4.

Cam follower 6 includes a shaft portion 6a arranged on the upper end surface of piston 5 and a cylindrical portion 6b rotatably supported on this shaft portion 6a through a bearing 6c. This cam follower 6 is arranged in storage chamber 9a, and bearing 6c is also dipped in the lubricating oil filling up storage chamber 9a. Therefore, friction caused between cylindrical portion 6b and shaft portion 6a is reduced. Thus, the power supplied from rotary shaft 3 to cam follower 6 can be excellently transmitted to piston 5 without reduction. When cam follower 6 is displaced along cam 4, further, cam follower 6 can be inhibited from vibration or the like.

Piston 5 is slidably arranged in through-hole 10a formed in frame 10, and this piston 5 is directed from rotary shaft 3 toward drawbar 15, and provided in the form of a bottomed cylinder. Piston 5 includes a top surface 5d to which cam follower 6 is fixed, a leg 5b formed on the peripheral edge of this top surface 5d to enclose recess 5a and a through-hole 5c formed on the side surface of this leg 5b. This piston 5 is so arranged that the centerline O2 of piston 5 and the centerline O of drawbar 15 coincide with each other. The centerline O5 of through-hole 10a is also arranged to coincide with centerlines O and O2. Centerline O of drawbar 15 is a centerline extending in a direction where drawbar 15 slides in an operation of unclamping tool 25, and centerline O2 of piston 5 is a centerline extending in a direction where piston 5 slides in the unclamping operation. The coincidence of centerlines O, O2 and O5 means substantial coincidence, and is not restricted to a case where the same physically completely coincide with each other.

The centerline O3 of recess 5a is so formed as to coincide with centerline O of drawbar 15. Centerline O3 of recess 5a is a centerline extending in the direction where piston 5 slides in the unclamping operation. The coincidence of centerlines O3 and O means substantial coincidence, and is not restricted to a case where the same physically completely coincide with each other.

For example, the centerline O4 of elastic member 7 such as a coiled spring is so arranged as to coincide with centerline O of drawbar 15. In other words, elastic member 7 is so arranged as to enclose centerline O. Contact portions of elastic member 7 and piston 5 are symmetrically positioned with respect to centerline O, so that urging force applied from elastic member 7 to piston 5 is symmetrically distributed with respect to centerline O. In particular, elastic member 7 applying pressing force to piston 5 is so singularized that distribution of the pressing force applied from elastic member 7 to piston 5 is hardly uneven.

Centerline O2 of piston 5 is so arranged as to coincide with centerline O and the urging force applied from elastic member 7 to piston 5 is symmetrically distributed with respect to centerline O while centerline O5 of through-hole 10a slidably receiving piston 5 is so arranged as to coincide with centerline O. In the unclamping operation, therefore, piston 5 excellently slides along centerline O without causing backlash between the same and the inner peripheral surface of through-hole 10a.

While the example employing a coiled spring as elastic member 7 is shown in the first embodiment, the present invention is not restricted to this. In other words, elastic member 7 may simply be so arranged that the pressing force applied from elastic member 7 to piston 5 is symmetrically distributed with respect to centerline O, and an elastic member capable of applying such pressing force may be employed.

A pressing member 5b1 pressing drawbar 15 along centerline O is provided on the outer peripheral surface of leg 5b closer to the lower end. The lower end of this pressing member 5b1 is rendered contactable with a step 15a formed on drawbar 15. A threaded portion is formed on the outer peripheral surface of this leg 5b, while another threaded portion meshing with the threaded portion formed on leg 5b is formed on the inner peripheral surface of pressing member 5b1. Therefore, the position can be controlled along centerline O by rotating pressing member 5b1. The position of position-controlled pressing member 5b1 is fixed by a fixing nut 5g. In working, drawbar 15 rotates about centerline O, and hence pressing member 5b1 retreats to a position separating from step 15a of drawbar 15 by a distance $\underline{a}$ along centerline O.

As hereinabove described, piston 5 is excellently displaced without causing backlash in the unclamping operation, whereby the position of piston 5 is so correctly controlled that piston 5 can be correctly retreated to a prescribed position upon completion of the unclamping operation. Therefore, no margin may be added in consideration of inconvenience such as backlash caused on piston 5 when setting the distance $\underline{a}$, whereby the distance $\underline{a}$ can be reduced.

Thus, the distance $\underline{a}$ is so reduced that the time required by pressing member 5b1 to come into contact with drawbar 15 can be reduced when unclamping tool 25. Therefore, the time required for unclamping tool 25 can be reduced, and the time required for exchanging tool 25 can also be reduced.

Figure 4:
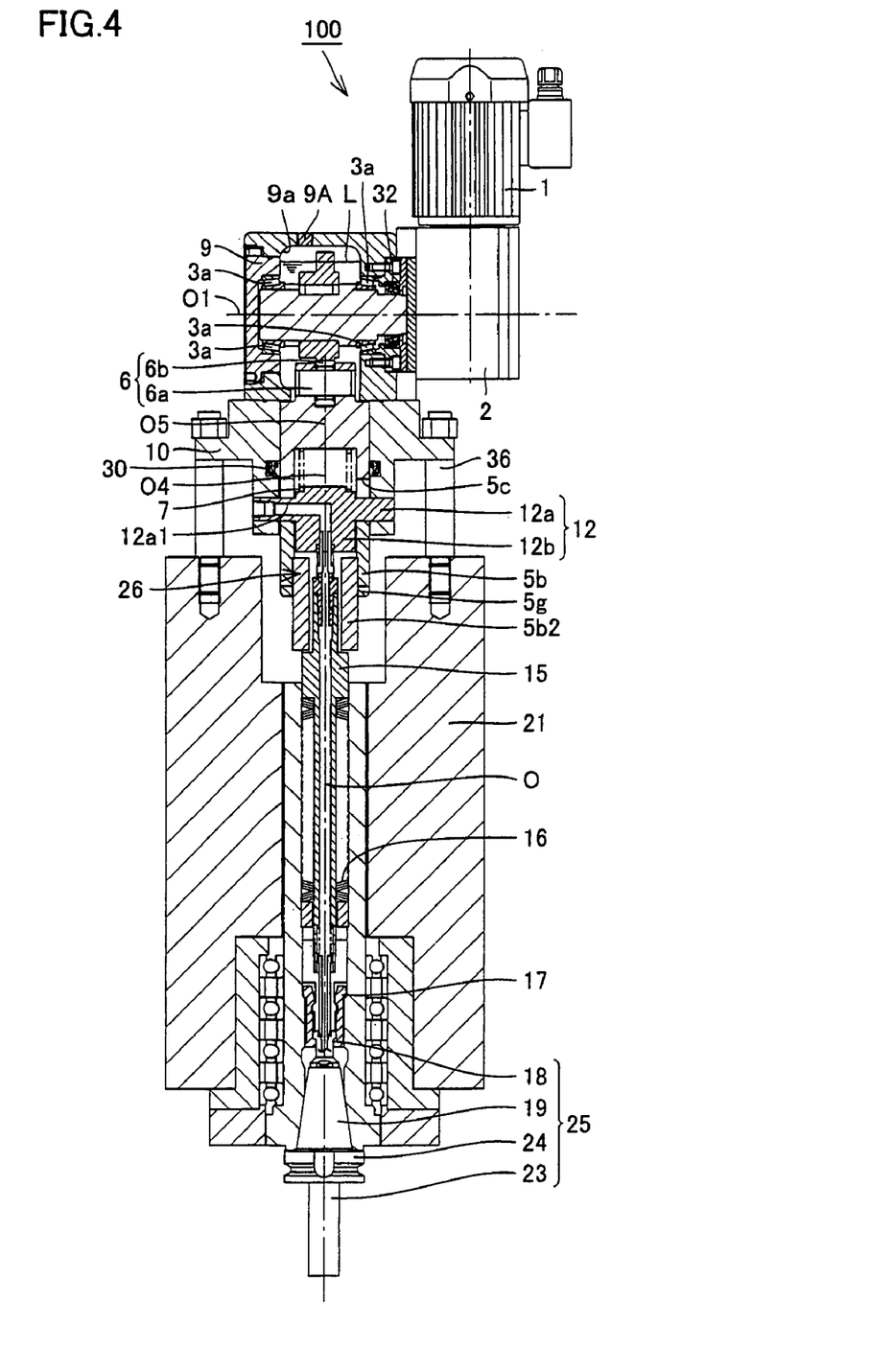
FIG. 4 is a sectional view of the tool unclamping device showing a modification of a pressing member.

Pressing member 5b1 is not restricted to the aforementioned one. For example, FIG. 4 is a sectional view of tool unclamping device 100 showing a modification of pressing member 5b1. As shown in FIG. 4, this pressing member 5b2 is arranged on the inner peripheral surface side of leg 5b of piston 5, and cylindrically formed. A threaded portion meshing with the threaded portion formed on the inner peripheral surface of leg 5b is formed on the outer peripheral surface of pressing member 5b2, so that the position along centerline O is controllable.

Referring to FIG. 2, oil supply mechanism 26 includes an oil circulation path 26b formed on drawbar 15 for circulating cutting oil and oil such as a coolant and a rotary joint 26a arranged on an end of drawbar 15 closer to piston 5. Rotary joint 26a includes a joint 26a1 partially inserted into oil circulation path 26b and another joint 26a2 provided on this joint 26a1 so that transmission of torque from joint 26a1 is suppressed.

Joint 26a1 includes an oil circulation path 51 connected to oil circulation path 26b, and has a cylindrical portion 47 fitted into oil circulation path 26b and a bulging portion 48 formed on the upper end of this cylindrical portion 47 with a diameter larger than that of cylindrical portion 47. A contact portion 46 of ceramics or the like, for example, is annularly formed on the upper end surface of bulging portion 48.

Joint 26a2 includes an oil circulation path 52 communicating with oil circulation path 51, and further includes a cylindrical portion 50 and a bulging portion 49 formed on the lower end of this cylindrical portion 50 with a diameter larger than that of cylindrical portion 50. A contact portion 45 of ceramics, for example, corresponding to contact portion 46 is annularly provided on the lower end surface of this bulging portion 49. An elastic member 30 such as a coiled spring is arranged between bulging portion 49 of joint 26a2 and support member 12, and this elastic member 30 presses joint 26a2 toward drawbar 15. Therefore, joint 26a2 is pressed against joint 26a1, for ensuring connection between oil circulation paths 52 and 51.

Contact portions 45 and 46 are so arranged as to come into contact with each other. Both contact portions 45 and 46 are made of ceramics or the like, whereby friction between contact portions 45 and 46 is reduced. When performing working with tool 25, therefore, joint 26a1 rotates along with drawbar 15 while stress circumferentially applied from joint 26a1 to joint 26a2 is so reduced that joint 26a2 is inhibited from rotating in the circumferential direction. Joints 26a1 and 26a2 are so arranged that the centerlines thereof coincide with centerline O.

Support member 12 includes a plate 12a, inserted into through-hole 5c, provided with an oil circulation path 12a1 and a joint support member 12b fixed to this plate 12a and arranged in recess 5a. The thickness of plate 12a along centerline O is rendered smaller than the length of through-hole 5c formed on piston 5 along centerline O. The width of plate 12a in a direction perpendicular to centerline O substantially coincides with the circumferential direction of through-hole 5c, so that plate 12a inhibits piston 5 provided with through-hole 5c from rotating in the circumferential direction. Thus, piston 5 is so inhibited from rotating in the circumferential direction that cam follower 6 arranged on the upper end of piston 5 is inhibited from relatively rotating with respect to cam 4. Therefore, contact portions of cylindrical portion 6b of cam follower 6 and the outer peripheral surface of cam 4 are linearized so that the power is excellently transmitted from cam 4 to cam follower 6. In other words, piston 5 so rotates about centerline O that contact portions of the outer peripheral surface of cam 4 and cylindrical portion 6b of cam follower 6 are inhibited from being dotted and suppressing the transmission of the power from cam 4 to cam follower 6. Oil seal 31 is located above through-hole 5c when piston 5 is positioned on the top dead center.

This plate 12a is inserted into a through-hole formed in joint support member 12b, and the peripheral edge of plate 12a is fixed to frame 10 with bolts or the like. Plate 12a is also fixed to joint support member 12b with bolts or the like. Therefore, plate 12a and joint support member 12b are located on constant positions throughout the unclamping operation. Joint support member 12b includes an oil circulation path 12b1 communicating with oil circulation path 12a1 formed in plate 12a. This oil circulation path 12b1 opens toward drawbar 15 on the lower surface of joint support member 12b, and extends on centerline O in joint support member 12b. Cylindrical portion 50 of joint 26a2 is inserted into this oil circulation path 12b1, and joint 26a2 is supported by joint support member 12b to be slidable along the sliding direction of drawbar 15.

When drawbar 15 is positioned on the top dead center, the length of a part of cylindrical portion 50 positioned in oil circulation path 12b1 along centerline O is rendered larger than the length of drawbar 15 sliding along centerline O in the unclamping operation. Even if drawbar 15 slides during the operation of unclamping the tool, therefore, joint 26a2 is inhibited from dropping from joint support member 12b.

In recess 5a, elastic member 7 such as a coiled spring is arranged between the lower surface of top surface 5d opposed to drawbar 15 and the upper end surface of joint support member 12b. In other words, a region of recess 5a located between joint support member 12b and the lower surface of top surface 5d serves as an elastic member storage chamber 5a1 storing elastic member 7. The diameter of this elastic member storage chamber 5a1 is rendered larger than the diameter of drawbar 15. Therefore, the diameter of elastic member 7 stored in elastic member storage chamber 5a1 can also be rendered larger than the diameter of drawbar 15. While joint support member 12b is located on the constant position also in the unclamping operation, piston 5 slides centered on centerline O, whereby elastic member 7 contracts due to the sliding of piston 5 to exert pressing force on piston 5. The pressing force applied from elastic member 7 to piston 5 is also distributed in the form of a large-diametral circle centered on centerline O, whereby piston 5 can slide in through-hole 10a in a balanced state.

Frame 10 is fixed to spindle head 21 through rods 36, includes a cylindrically formed cylindrical portion 10b, and is so arranged that piston 5 is slidable in cylindrical portion 10b. The lower end of this cylindrical portion 10b closer to drawbar 15 is formed to be located closer to drawbar 15 than through-hole 5c when piston 5 is positioned on the top dead center. Thus, an area is so ensured that the inner wall surface of through-hole 10a of frame 10 and the outer peripheral surface of piston 5 come into contact with each other. In the process of the unclamping operation, therefore, piston 5 guided through the inner wall surface of through-hole 10a can excellently moved along centerline O.

Referring to FIG. 1, drawbar 15 is arranged in a through-hole 22a formed in spindle 22. Through-hole 22a includes a receiving portion 22a1 receiving drawbar 15, a retreatal portion 22a2 formed closer to the lower end than this receiving portion 22a1 with a larger diameter than receiving portion 22a1 and a taper 22a3 formed closer to the lower end than this retreatal portion 22a2 for grasping tool 25.

Drawbar 15 is pressed against support member 12 by a plurality of disc springs 16 arranged in spindle 22. Tool 25 includes a tool 23 cutting a workpiece, a tool holder 24 to which this tool 23 is fixed, a shank 19 provided on tool holder 24 and grasped by spindle 22 and a pull rod 18 provided on tool holder 24. An oil circulation path 25a circulating the cutting oil or the oil such as a coolant is formed in this tool 25, and an opening of oil circulation path 25a is formed on the upper end of pull rod 18.

Oil circulation path 26b shown in FIG. 2 and oil circulation path 25a communicate with each other. A stop portion 18a slightly enlarged in diameter is formed on pull rod 18, and a collet 17 is arranged on the outer peripheral surface of pull rod 18. A stop portion 17a engaging with stop portion 18a is formed on this collet 17.

Figure 3:
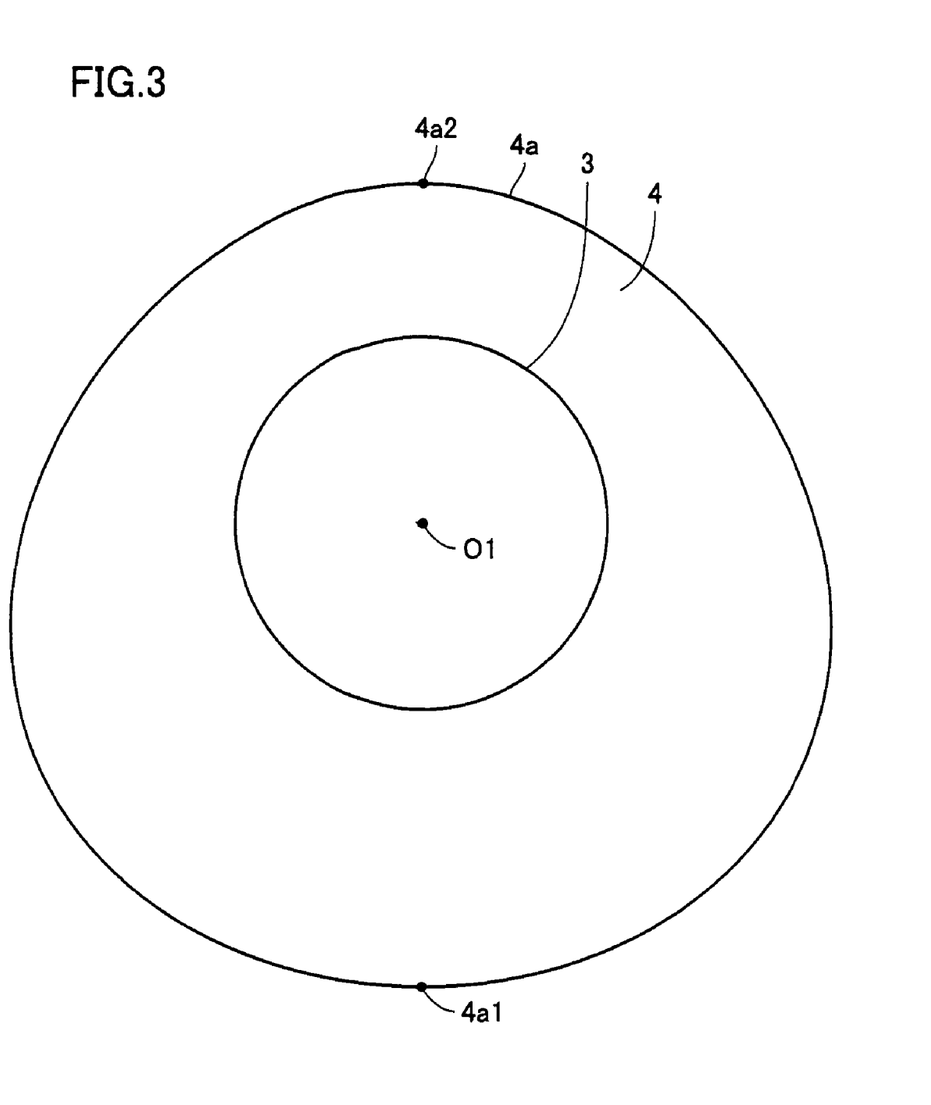
FIG. 3 is a sectional view of a cam shown in FIG. 2 in a direction perpendicular to a rotation axis.

FIG. 3 is a sectional view of cam 4 shown in FIG. 2 in a direction perpendicular to a rotation axis O1. As shown in FIG. 3, the outer peripheral surface 4a of cam 4 is rendered eccentric to rotation axis O1 of rotary shaft 3.

In the vicinity of a point 4a1 of outer peripheral surface 4a of cam 4 most separating from rotation axis O1, the coefficient of fluctuation of the distance from rotation axis O1 with respect to the distance in the circumferential direction of outer peripheral surface 4a from point 4a1 is rendered smaller than the coefficient of fluctuation in the remaining region of outer peripheral surface 4a.

Operations of tool unclamping device 100 having the aforementioned structure are described. Referring to FIG. 1, tool 25 grasped by spindle 22 must first be unclamped, in order to exchange tool 25 grasped on the lower end of spindle 22 for another tool stored in a tool magazine or the like. In the initial state of unclamping tool 25, a point 4a2 of outer peripheral surface 4a of cam 4 shown in FIG. 3 having the smallest distance from rotation axis O1 is in contact with cam follower 6 shown in FIG. 2. At this time, piston 5 is positioned on the top dead center due to the pressing force from elastic member 7.

When cam 4 rotates about rotation axis O1, the distance between the portion of outer peripheral surface 4a in contact with cam follower 6 and rotation axis O1 gradually increases. Therefore, piston 5 lowers toward drawbar 15 against the pressing force from elastic member 7.

When piston 5 is displaced toward drawbar 15, pressing member 5b1 comes into contact with drawbar 15. Distance a between pressing member 5b1 and step 15a of drawbar 15 is so set small that pressing member 5b1 presses drawbar 15 in an early stage from starting of the unclamping operation. Thus, drawbar 15 is displaced downward against the pressing force from disc springs 16.

When drawbar 15 is displaced downward, joint 26a1 shown in FIG. 2 is also displaced downward. On the other hand, joint 26a2 is urged downward by elastic member 30, whereby joint 26a2 is also displaced downward in the state in contact with joint 26a1.

When drawbar 15 is displaced downward in FIG. 1, collet 17 is also pressed by drawbar 15 and displaced downward. Stop portion 17a of collet 17 retreats into retreatal portion 22a2 formed in spindle 22, thereby disengaging collet 17 and pull rod 18 from each other. When the portion of the outer peripheral surface of cam 4 coming into contact with cam follower 6 is located on point 4a1 shown in FIG. 3, tool 25 shown in FIG. 1 is unclamped from spindle 22.

The outer peripheral surface of cam 4 is so formed that the distance from rotation axis O1 slightly fluctuates in the vicinity of point 4a1. Therefore, the distance for displacing cam follower 6 with cam 4 when unclamping tool 25 is reduced, thereby suppressing a load applied to motor 1 in rotation of cam 4. When the portion of outer peripheral surface 4a of cam 4 around point 4a1 and cam follower 6 are in contact with each other, therefore, cam 4 rotates excellently. Thus, cam 4 so excellently rotates that the power from motor 1 is reliably transmitted to cam follower 6 through cam 4. Therefore, cam follower 6 is so reliably displaced that piston 5 can be displaced toward drawbar 15. Thus, drawbar 15 can be reliably displaced downward, so that tool 25 can be unclamped.

After tool 25 is unclamped in this manner, cam 4 further rotates about rotation axis O1. Referring to FIG. 3, therefore, the diameter of the contact position between cam follower 6 shown in FIG. 2 and outer peripheral surface 4a of cam 4 is gradually reduced. Therefore, cam 4 is displaced to retreat from cam follower 6 in FIG. 2, whereby the pressing force applied to cam follower 6 from cam 4 is reduced. At this time, drawbar 15 is upwardly displaced due to the pressing force from disc springs 16. Piston 5 is also upwardly displaced through drawbar 15 and pressing member 5b1 due to the pressing force from disc springs 16. When the pressing force from cam 4 is further reduced, piston 5 is further upwardly displaced due to the pressing force from disc springs 16, whereby shank 19 of tool 25 shown in FIG. 1 comes into contact with taper 22a3 of spindle 22. When tool 25 is thus grasped by spindle 22, drawbar 15 cannot be upwardly displaced. Then, step 15a of drawbar 15 and pressing member 5b1 are separated from each other due to the pressing force of elastic member 7, whereby the rotary motion of drawbar 15 is inhibited from transmission to piston 5 in working. Piston 5 is rendered excellently movable along centerline O, whereby no margin may be provided in consideration of backlash caused on piston 5 but distance a between step 15a and the lower surface of pressing member 5b1 can be reduced. Thus, the time required for retreating pressing member 5b1 can be reduced, and the clamping operation for grasping the exchanged new tool can be ended in a short time.

When the machine tool including tool unclamping device 100 having the aforementioned structure works a workpiece, spindle 22 rotates about centerline O in the state grasping tool 25 in FIG. 1. Oil supply mechanism 26 supplies the cutting oil etc. to tool 25, so that working can be excellently performed. Plate 12a is located on a prescribed position and undisplaced in both of working and the unclamping operation. Thus, an unshown pipe connected to oil circulation path 12a1 formed in this plate 12a is inhibited from rocking. Therefore, the connected pipe can be inhibited from damage.

While oil supply mechanism 26 supplies the cutting oil to tool 25 for reducing friction caused between the workpiece and tool 23 and supplies the coolant to tool 25 for inhibiting tool 23 from temperature increase in the first embodiment, the present invention is not restricted to this. For example, oil supply mechanism 26 may alternatively be replaced with an air supply mechanism supplying air to tool 25. In this case, oil circulation paths 12a1 and 12a2 formed on support member 12 function as air circulation paths. The air supply mechanism is so provided in this manner that chips can be blown out and working can be excellently performed. Further, pipes connecting an air source and the air circulation paths with each other can also be inhibited from breakage, similarly to the case of the aforementioned oil supply mechanism 26.

Second Embodiment

Figure 5:
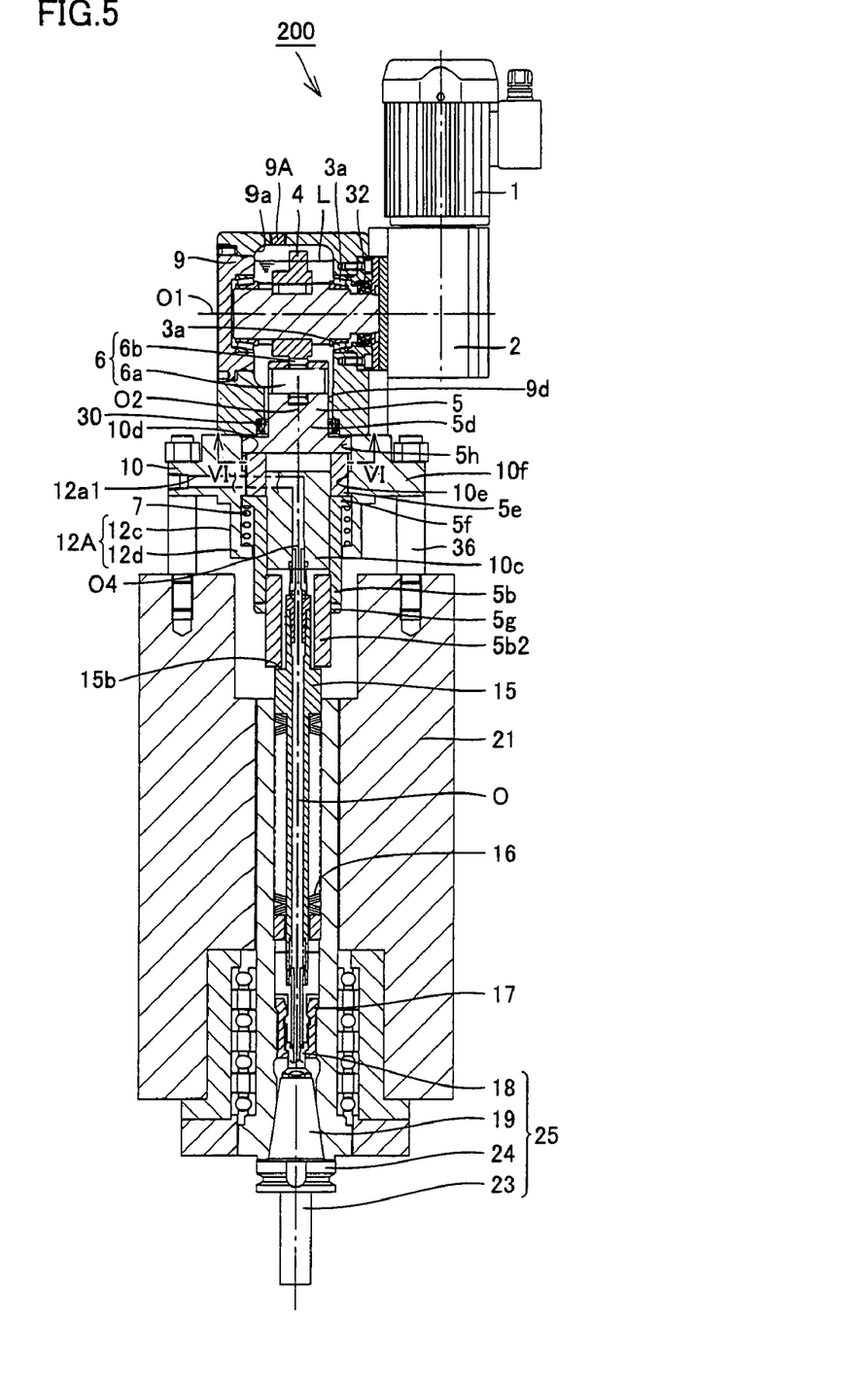
FIG. 5 is a sectional view of a tool unclamping device according to a second embodiment.
Figure 6:
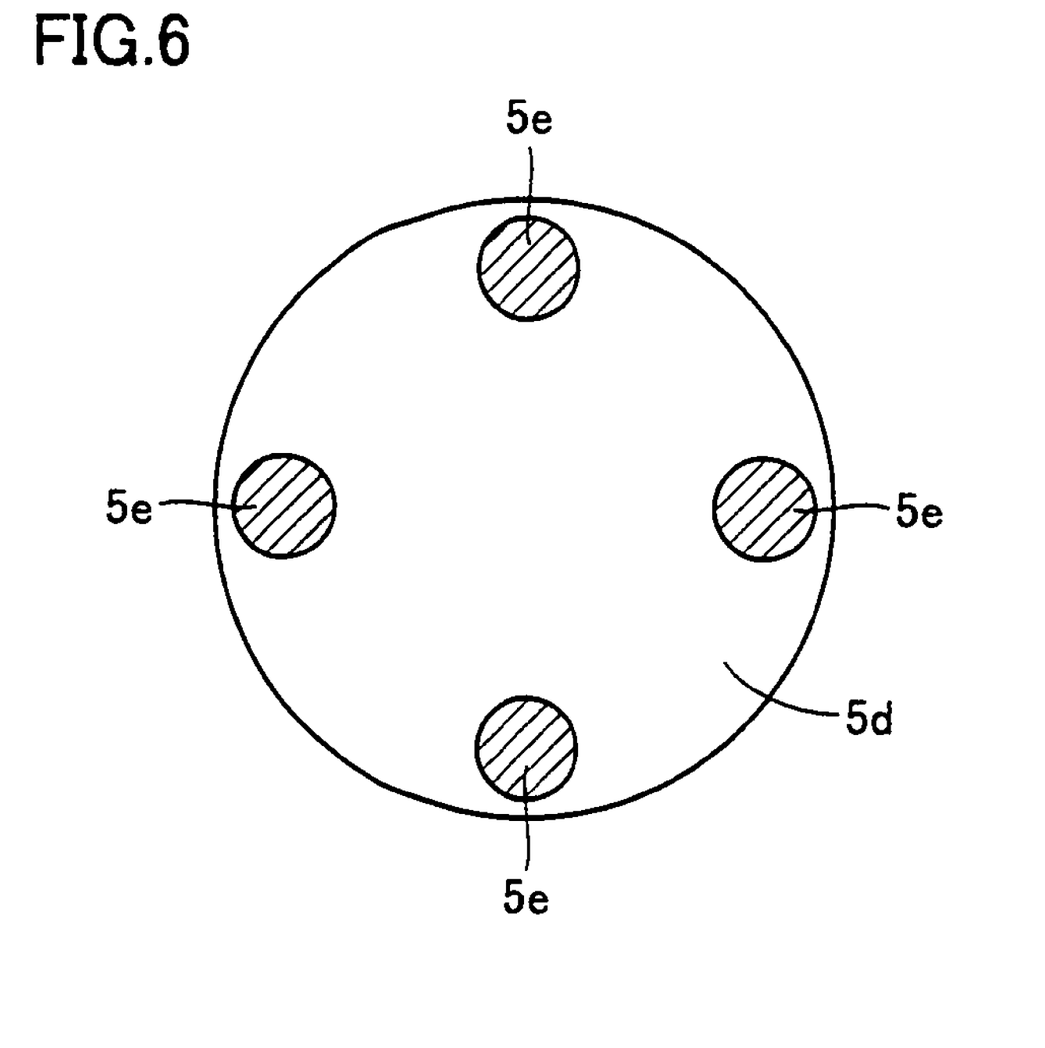
FIG. 6 is a sectional view taken along the line VI-VI in FIG. 5.

A tool unclamping device 200 according to a second embodiment is described with reference to FIGS. 5 and 6. FIG. 5 is a sectional view of tool unclamping device 200 according to the second embodiment. As shown in FIG. 5, a piston 5 includes a top surface 5d inserted into a through-hole 9d formed on the lower end surface of a frame 9, a flange 5h formed on the lower end of top surface 5d with a diameter larger than that of top surface 5d, a plurality of shaft portions 5e extending downward from the peripheral edge of this flange 5h and a cylindrical leg 5b connected to the lower ends of these shaft portions 5e. FIG. 6 is a sectional view taken along the line VI-VI in FIG. 5. As shown in FIG. 6, shaft portions 5e are arranged on four portions, for example, along the outer peripheral edge of top surface 5d. Referring to FIG. 5, a protrusion 5f protruding in the radial direction of leg 5b is formed on the outer peripheral surface of the upper end of leg 5b.

Another frame 10 includes a top surface portion 10f provided in the form of a disc, a columnar portion 10c formed on the lower surface of this top surface portion 10f to protrude downward and a support portion 12A formed on the lower surface of top surface portion 10f to cover the periphery of leg 5b of piston 5.

Columnar portion 10c is arranged to be in sliding contact with the inner wall surface of cylindrical leg 5b. Therefore, a contact area between piston 5 and columnar portion 10c is so ensured that piston 5 is guided through the outer peripheral surface of columnar portion 10c and can excellently slide along a centerline O.

A recess 10d receiving flange 5h of piston 5 is formed on the upper surface of top surface portion 10f, and a through-hole 10e receiving shaft portion 5e is formed on the bottom of this recess 10d. Columnar portion 10c is provided in the form of a column, and arranged in cylindrical leg 5b. An oil circulation path 12a1 supplying cutting oil, a coolant etc. to an oil supply mechanism 26 is formed through this columnar portion 10c and top surface portion 10f. Thus, frame 10 provided with oil circulation path 12a1 is fixed to a spindle head 21 similarly to tool unclamping device 100 according to the aforementioned first embodiment, and located on a constant position throughout an unclamping operation. Thus, a pipe connected to this oil circulation path 12a1 is inhibited from rocking or the like.

Support portion 12A includes a cylindrical portion 12c so formed as to cover the periphery of leg 5b and a protrusion 12d formed on the lower end of this cylindrical portion 12c to so protrude as to reduce the diameter of an opening of cylindrical portion 12c. This protrusion 12d is located closer to a drawbar 15 than flange 5h.

An elastic member 7 such as a coiled spring is arranged between this protrusion 12d and protrusion 5f formed on leg 5b. In other words, elastic member 7 is arranged along the outer peripheral surface of leg 5b, the upper end of elastic member 7 is supported by protrusion 5f, and the lower end of elastic member 7 is supported by protrusion 12d. In other words, leg 5b is inserted into the central portion of elastic member 7 provided in the form of a coil. When elastic member 7 contracts, therefore, elastic member 7 can be inhibited from buckling due to leg 5b inserted into elastic member 7.

Elastic member 7 is so arranged that the centerline O4 of elastic member 7 and centerline O coincide with each other, and piston 5 is also so arranged that the centerline O2 of piston 5 and centerline O coincide with each other. Also in tool unclamping device 200 according to the second embodiment, therefore, piston 5 is inhibited from inconvenience such as backlash similarly to tool unclamping device 100 according to the aforementioned first embodiment. The remaining structure is similar to that of tool unclamping device 100 according to the aforementioned first embodiment, and identical components are denoted by identical reference numerals while redundant description is not repeated.

Tool unclamping device 200 structured in this manner can excellently slide piston 5 along centerline O, reduce the distance between a pressing member 5b2 and a step 15b and end the unclamping operation in a short time, similarly to tool unclamping device 100 according to the aforementioned first embodiment.

Third Embodiment

A tool unclamping device 300 according to a third embodiment is described with reference to FIGS. 7 and 8. Components similar to those of tool unclamping devices 100 and 200 according to the aforementioned first and second embodiments are denoted by identical reference numerals, and redundant description is not repeated.

Figure 7:
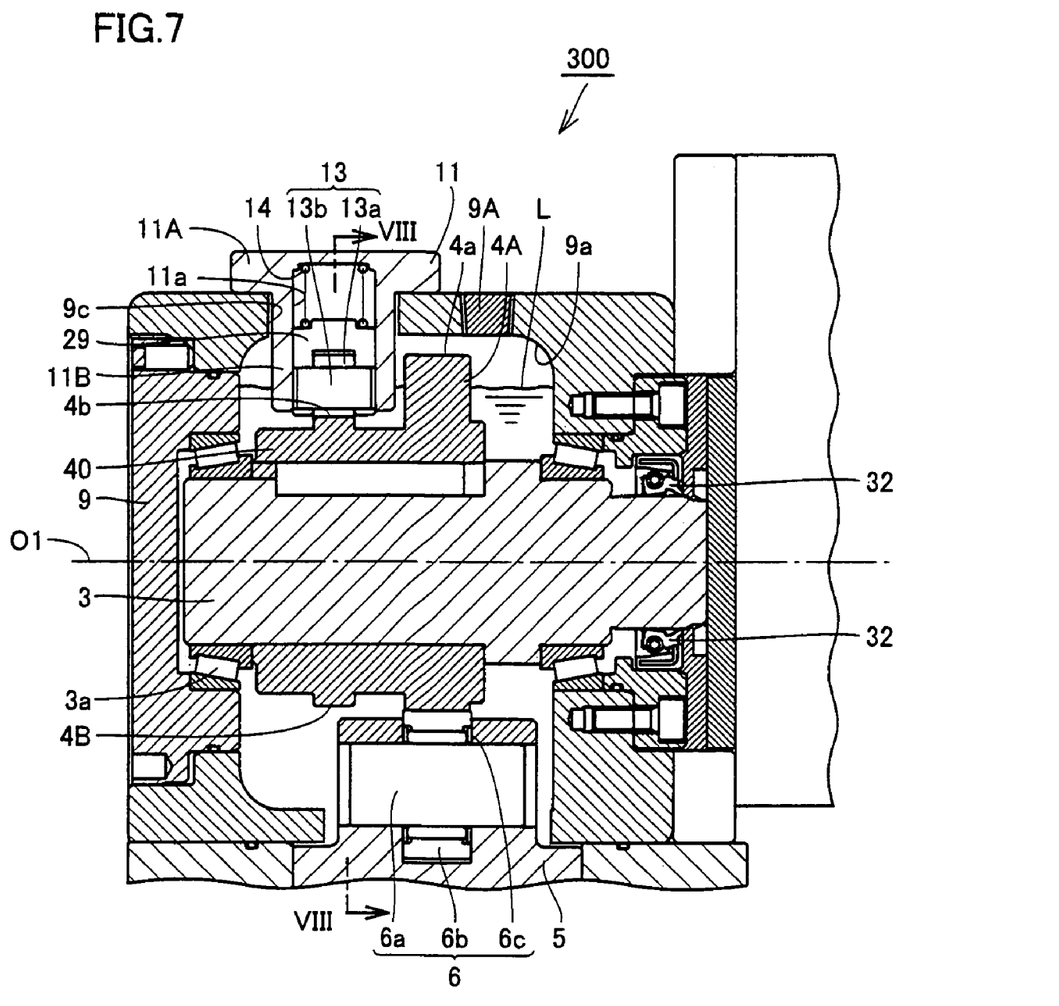
FIG. 7 is a sectional view of a portion around a rotary shaft of a tool unclamping device according to a third embodiment.
Figure 8:
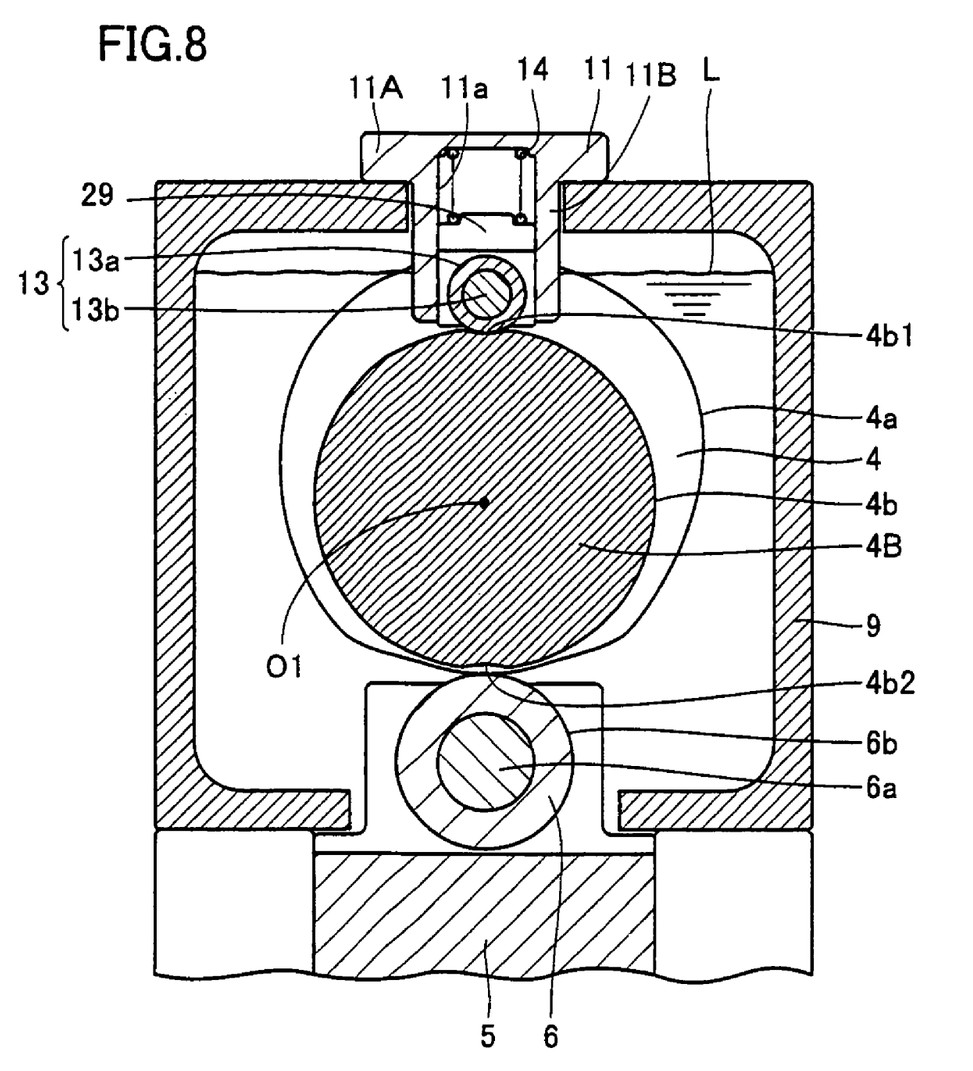
FIG. 8 is a sectional view taken along the line VIII-VIII in FIG. 7.

FIG. 7 is a sectional view of a portion around a rotary shaft 3, and FIG. 8 is a sectional view taken along the line VIII-VIII in FIG. 7.

As shown in FIGS. 7 and 8, this tool unclamping device 300 includes a cylindrical fixing member 40 fixed to the outer surface of rotary shaft 3 and a cam follower (pressing member) 13 urged toward this fixing member 40, while an eccentric cam 4 pressing a cam follower 6 provided on the upper end of a piston 5 and a concentrically formed member 4B are provided on the outer surface of this fixing member 40. Referring to FIG. 8, the outer peripheral surface 4b of member (cam member) 4B is concentrically formed about a rotation axis O1, and a plurality of recesses 4b1 and 4b2 are formed on outer peripheral surface 4b. Recesses 4b1 and 4b2 are symmetrically arranged with respect to rotation axis O1.

Figure 12:
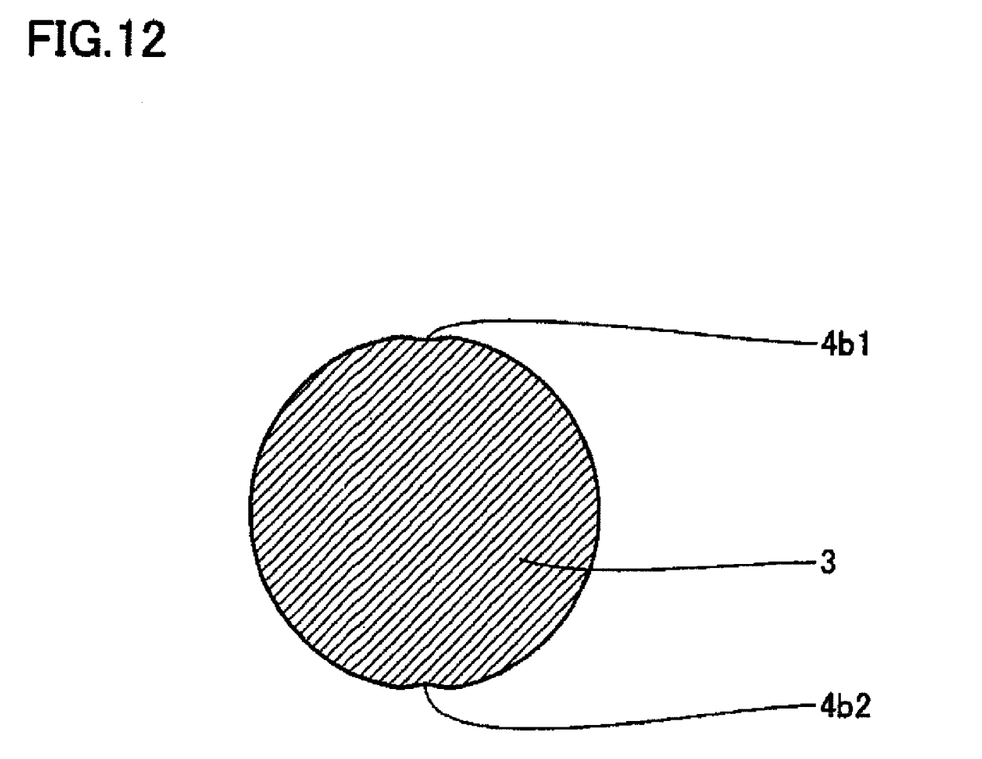
FIG. 12 is a schematic representation of the rotary shaft showing an alternate form of the third embodiment.

While member 4B is provided for forming recesses 4b1 and 4b2 in the third embodiment, recesses 4b1 and 4b2 may alternatively be formed on cam 4 without providing member 4B, or recesses 4b1 and 4b2 may further alternatively be formed on the outer surface of rotary shaft 3 as shown in FIG. 12.

Referring to FIG. 7, a housing 11 in the form of a bottomed cylinder inserted into a through-hole 9c communicating with a storage chamber 9a, an elastic member 14 such as a coiled spring arranged in a recess 11a formed on housing 11 and a pressing member 29 pressed by elastic member 14 for pressing cam follower 13 against member 4B are provided on the upper surface side of frame 9. Housing 11 includes a top surface 11A having a diameter larger than that of the opening of through-hole 9c and a cylindrical portion 11B connected to this top surface 11A and inserted into through-hole 9c for defining recess 11a. Cam follower 13 includes a rotary shaft 13b rotatably supported on housing 11 and a cylindrical portion 13a rotatably supported on this rotary shaft 13b. Recesses 4b1 and 4b2 shown in FIG. 8 are rendered capable of partially receiving cylindrical portion 13a.

In tool unclamping device 300 having this structure, driving of motor 1 shown in FIG. 1 is stopped, cylindrical portion 13a of cam follower 13 partially enters recess 4b1, and rotation of rotary shaft 3 is suppressed in working or the like. At this time, point 4a2 of outer peripheral surface 4a of cam 4 shown in FIG. 3 and cam follower 6 are in contact with each other. In order to unclamp tool 25 from spindle 22 in FIG. 1, motor 1 is first driven to rotate rotary shaft 3, while cylindrical portion 13a of cam follower 13 and recess 4b1 are disengaged from each other in FIG. 8.

When rotary shaft 3 further rotates so that contact portions of cylindrical portion 6b of cam follower 6 and outer peripheral surface 4a of cam 4 are in the vicinity of point 4a1 of outer peripheral surface 4a of cam 4 shown in FIG. 3, driving of motor 1 is stopped. Also when driving of motor 1 is stopped, rotary shaft 3 further rotates due to inertia.

Thus, a portion close to recess 4b2 formed on outer peripheral surface 4b of member 4B and cam follower 13 are in contact with each other when driving of motor 1 is stopped, and rotary shaft 3 further rotates so that cylindrical portion 13a of cam follower 13 enters recess 4b2 and can stop rotation of rotary shaft 3. Then, an unclamped state of tool 25 can be so maintained that tool 25 can be exchanged.

Thus, motor 1 may simply be driven/controlled to an ON-state in starting and to an OFF-state immediately before unclamping tool 25 in the operation of unclamping tool 25, and cylindrical portion 13b of cam follower 13 so enters recess 4b2 that tool 25 can be correctly maintained in the unclamped state.

In order to clamp a new tool 25 after completely exchanging tool 25, motor 1 is turned on for rotating rotary shaft 3 and disengaging cylindrical portion 13a and recess 4b2 from each other. When rotary shaft 3 further rotates so that the contact position between cam 4 and cam follower 6 is located in the vicinity of point 4a2 shown in FIG. 3, driving of motor 1 is stopped. Also when driving of motor 1 is stopped, rotary shaft 3 rotates due to inertia so that rotary shaft 3 and point 4a2 of outer peripheral surface 4a of cam 4 shown in FIG. 3 come into contact with each other for ending the operation of clamping tool 25. At this time, cylindrical portion 13a of cam follower 13 enters recess 4b1 for stopping rotation of rotary shaft 3 and maintaining the state of clamping tool 25.

Throughout the operations of unclamping, exchanging and clamping tool 25, motor 1 may simply be ON-OFF controlled in the aforementioned manner, so that driving of motor 1 can be easily controlled. Further, cylindrical portion 13b so enters recesses 4b1 and 4b2 that tool 25 can be maintained in the unclamped and clamped states.

Figure 9:
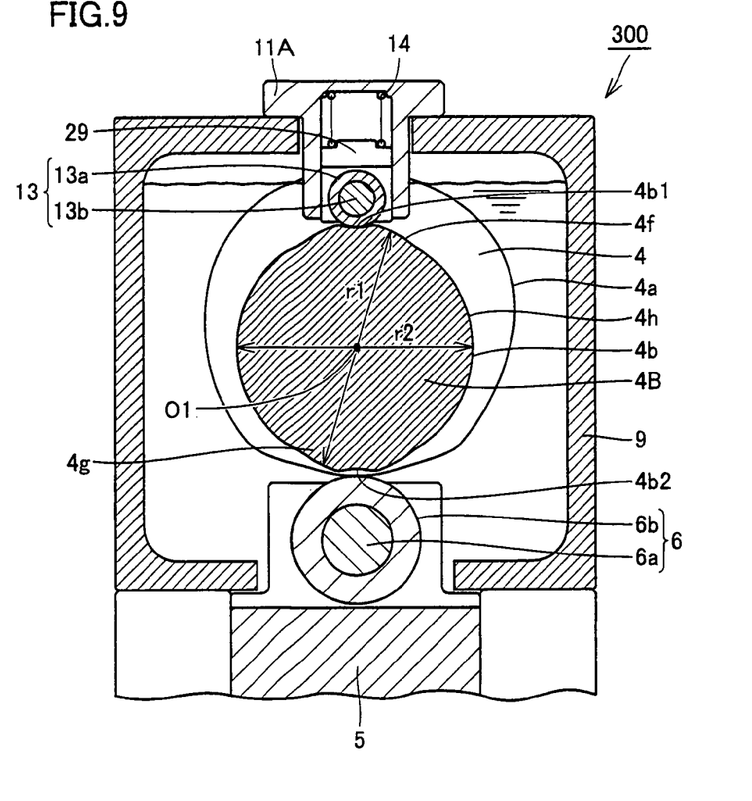
FIG. 9 is a sectional view showing a first modification of the tool unclamping device according to the third embodiment.
Figure 10:
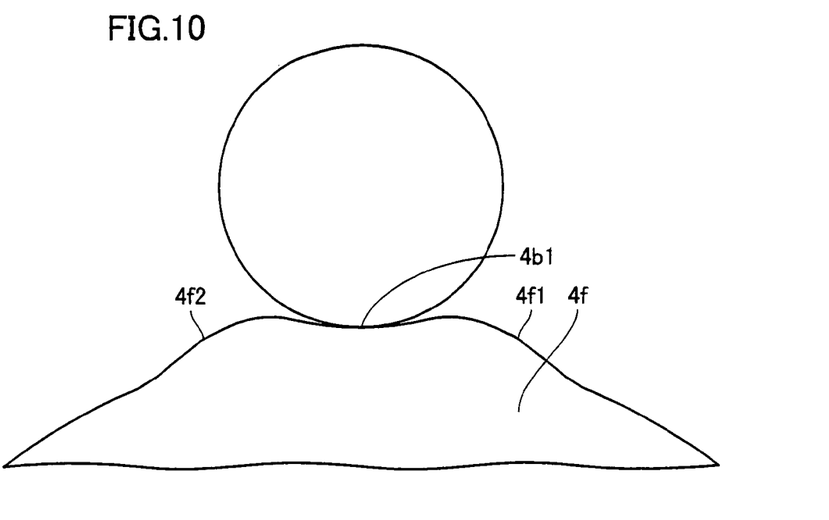
FIG. 10 is a sectional view showing a member in a partially enlarged manner in the example shown in FIG. 9.

FIG. 9 is a sectional view showing a first modification of tool unclamping device 300 according to the third embodiment, and FIG. 10 is a sectional view showing a member 4B in a partially enlarged manner in the example shown in FIG. 9. In a tool unclamping device 300 shown in FIGS. 9 and 10, bulging portions 4f and 4g bulging in the radial direction are formed on the peripheral surface of member 4B, dissimilarly to the example shown in FIG. 8. This bulging portion 4f includes a first bottom portion 4f1 increased in diameter r1 toward the rotational direction of member 4B, a second bottom portion 4f2 located backward beyond this first bottom portion 4f1 in the rotational direction and reduced in diameter r1 toward the rotational direction and a recess 4b1 located between first and second bottom portions 4f1 and 4f2. Bulging portion 4g is formed similarly to bulging portion 4f.

Thus, recesses 4b1 and 4b2 are formed on the apices of bulging portions 4f and 4g, whereby a cam follower 13 is pressed against a top surface 11A against urging force of an elastic member 14 when fitting into recesses 4b1 and 4b2. Therefore, pressing force applied from cam follower 13 to member 4B increases along first bottom portions 4f1 of bulging portions 4f and 4g.

The outer peripheral surface of first bottom portion 4f1 is so inclined as to intersect with the rotational direction of member 4B, whereby the pressing force applied from cam follower 13 to member 4B has a component of force opposite to the rotational direction of member 4B. Therefore, inertial force of member 4B and a rotary shaft 3 or the like is reduced when driving of a motor 1 is stopped.

Thus, the inertial force of rotary shaft 3 and member 4B or the like is so reduced that cam follower 13 can be inhibited from passing recesses 4b1 and 4b2 when rotary shaft 3 and member 4B shown in FIG. 7 rotate by the inertial force. Therefore, cam follower 13 and recesses 4b1 and 4b2 can be so reliably engaged with each other that rotary shaft 3 can be stopped on a prescribed position.

In other words, an unclamping operation time and a clamping operation time are so reduced that rotation of rotary shaft 3 can be correctly stopped even if member 4B and rotary shaft 3 are at high speeds of rotation and the inertial force is large when motor 1 is turned off.

Referring to FIG. 9, a portion of outer peripheral surface 4b of member 4B located between bulging portions 4f and 4g is a small-diametral portion 4h smaller in diameter than bulging portions 4f and 4g. This small-diametral portion 4h is in the form of an arc having a constant diameter r2. Therefore, cam follower 13 smoothly rolls on small-diametral portion 4h in the unclamping and clamping operations.

The present invention is not restricted to this example shown in FIGS. 9 and 10 but a portion resisting rotation of cam follower 13 may be formed on the outer peripheral surface of member 4B frontward beyond recesses 4b1 and 4b2, for example.

Figure 11:
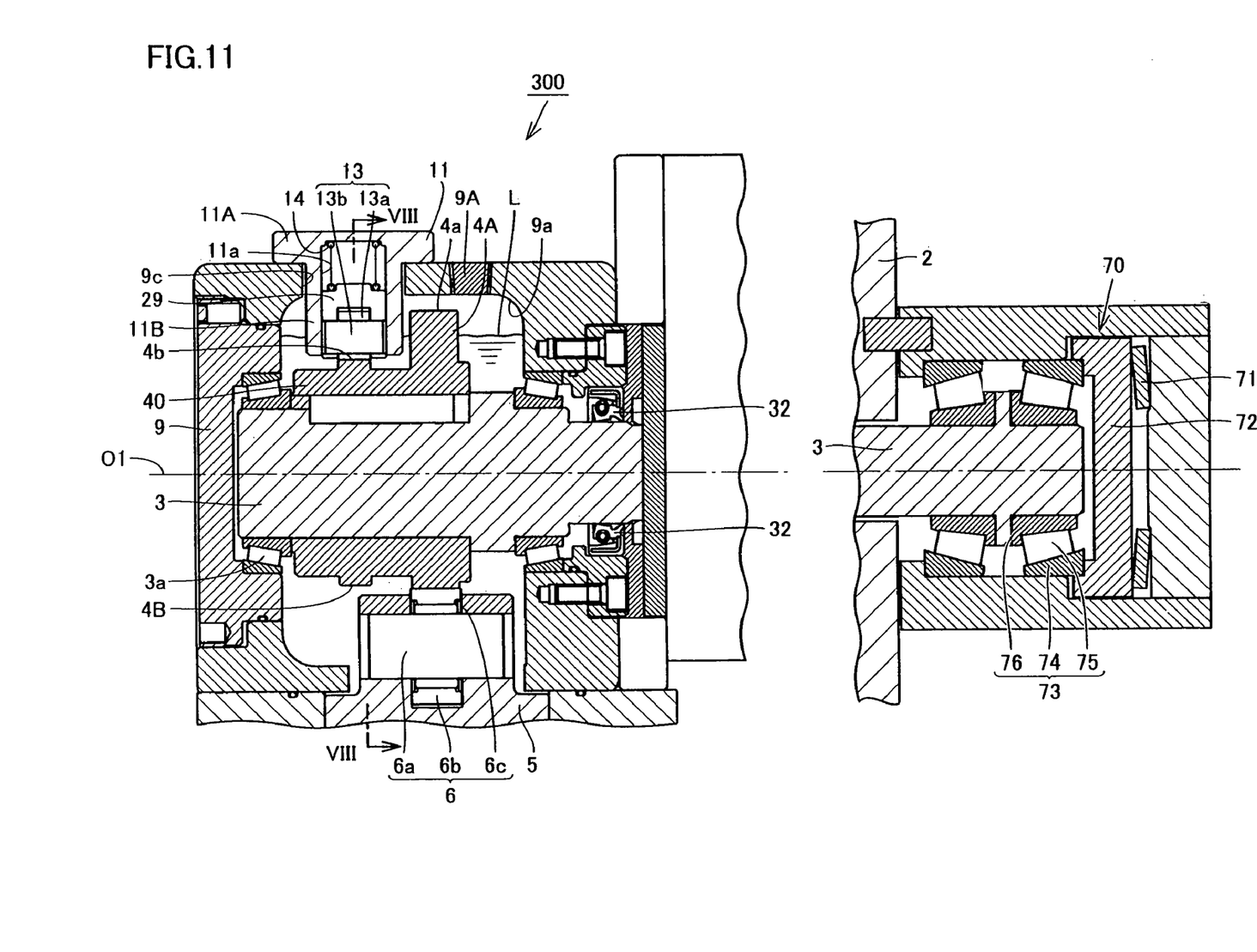
FIG. 11 is a sectional view showing a second modification of the tool unclamping device according to the third embodiment.

FIG. 11 is a sectional view showing a second modification of tool unclamping device 300 according to the third embodiment. In this example shown in FIG. 11, a load mechanism 70 regularly applying a load to a rotary shaft 3 is further provided.

This load mechanism 70 includes a bearing 73 rotatably supporting rotary shaft 3, a pressing member 72 pressing part of bearing 73 and disc springs 71 serving as urging means urging this pressing member 72 against bearing 73.

Bearing 73 includes a ring 76 fixed to the outer peripheral surface of rotary shaft 3, a ring 74 larger in diameter than ring 76 and a plurality of rolling members 75 arranged between rings 76 and 74.

Rolling members 75 are provided in the form of truncated cones, and arranged to be reduced in diameter toward pressing member 72.

The outer peripheral surface of ring 76 is also tapered to be reduced in diameter toward pressing member 72, and the inner peripheral surface of ring 74 is also tapered to be reduced in diameter toward pressing member 72.

Pressing member 72 is rendered approachable to/retreative from ring 74, and urged by disc springs 71. When pressing member 72 presses ring 74, the inner peripheral surface of ring 74 presses rolling members 75 against ring 76. Therefore, friction between ring 76 and rolling members 75 is so increased as to apply a load to rotation of rotary shaft 3.

The load applied to rotary shaft 3 is smaller than the output of a motor 1, so that motor 1 can rotate rotary shaft 3 for performing unclamping and clamping operations regardless of the load applied by load mechanism 70.

When driving of motor 1 is stopped immediately before completion of the unclamping and clamping operations, load mechanism 70 applies the load to rotary shaft 3, thereby reducing inertial force of rotary shaft 3. In other words, the example shown in FIG. 11 is provided with load mechanism 70 applying the load smaller than driving force of motor 1 to rotary shaft 3 throughout the overall processes of the unclamping and clamping operations. Thus, rotary shaft 3 can be stopped on a prescribed position by preventing a cam follower 13 from passing recesses 4b1 and 4b2 shown in FIG. 8.

Although the embodiments of the present invention have been described in the aforementioned manner, the embodiments disclosed this time must be considered as illustrative in all points and not restrictive. The range of the present invention is shown by the scope of claim for patent, and it is intended that all modifications within the meaning and range equivalent to the scope of claim for patent are included.

INDUSTRIAL AVAILABILITY

The present invention is preferable for a tool unclamping device capable of releasing and unclamping a tool clamped to a spindle when exchanging the tool mounted on the spindle of a machine tool.

The invention claimed is:

1. A tool unclamping device capable of unclamping a tool clamped to a spindle of a machine tool, comprising:
   a motor;
   a rotary shaft connected to said motor;
   a cam provided on said rotary shaft;
   a power transmission member pressed by said cam to be axially movable along a centerline thereof;
   a frame so arranged as to enclose said power transmission member;
   an elastic member, having a central axis coinciding with the centerline of said power transmission member, arranged against pressing force of said cam;
   a first pressing member, provided on said power transmission member such that a relative position between the first pressing member and said power transmission member is adjustable along the direction of the centerline; and
   an output shaft pressed by said pressing member for unclamping said tool.

2. The tool unclamping device according to claim 1, wherein
   said power transmission member has a recess at the center having a portion that extends in the radial direction thereof, said frame has a support portion located in said recess, and
said elastic member is arranged in said recess, located between said support portion and said power transmission member.

3. The tool unclamping device according to claim 1, wherein
said power transmission member has a leg protruding toward said output shaft beyond said frame and a protrusion formed on the outer surface of said leg for protruding from said leg in a radially expanding direction,
said frame has a support portion arranged on the outer peripheral surface area of said power transmission member and located closer to said output shaft than said protrusion is, and
said elastic member is arranged between said support portion and said protrusion.

4. The tool unclamping device according to claim 1, further comprising an oil supply mechanism capable of supplying oil to said tool, wherein
a supply passage supplying the oil to said oil supply mechanism is formed on said frame.

5. The tool unclamping device according to claim 1, further comprising a storage chamber defined by said frame and another hollow frame provided on said frame, wherein
said rotary shaft is rotatably supported through a bearing provided in said storage chamber, and said storage chamber is filled with lubricating oil up to a portion located above said bearing.

6. The tool unclamping device according to claim 5, wherein
said storage chamber is provided with a first through-hole receiving said rotary shaft and a second through-hole receiving said power transmission member,
said tool unclamping device further comprising:
a first sealing member capable of blocking a space between the outer surface of said rotary shaft and an opening edge of said first through-hole, and
a second sealing member capable of blocking a space between the outer surface of said power transmission member and an opening edge of said second through-hole.

7. The tool unclamping device according to claim 1, further comprising a gas supply mechanism capable of supplying gas to said tool, wherein
a supply passage supplying the gas to said gas supply mechanism is formed on said frame.

8. The tool unclamping device according to claim 1, further comprising:
a recess formed on the surface of any of a member mounted on said rotary shaft, said rotary shaft and said cam, and
a second pressing member urged toward said recess and partially received in said recess.

9. The tool unclamping device according to claim 8, further comprising a holding mechanism capable of holding said second pressing member in said recess.

10. The tool unclamping device according to claim 9, wherein
said holding mechanism includes a resistance area provided on a position of said surface frontwardly adjacent to said recess in the rotational direction of said rotary shaft for enabling the receiving of a pressing force larger than that applied to the remaining portion of said surface from said second pressing member oppositely to said rotational direction.

11. The tool unclamping device according to claim 9, wherein
said holding mechanism includes a load mechanism for applying a prescribed load to said rotary shaft.

12. The tool unclamping device according to claim 1, further comprising:
a second pressing member urged toward and partially received in a recess.

* * * * *